US012328550B2

(12) United States Patent
Jensen et al.

(10) Patent No.: US 12,328,550 B2
(45) Date of Patent: Jun. 10, 2025

(54) LOW LATENCY HEARING AID

(71) Applicant: Oticon A/S, Smørum (DK)

(72) Inventors: Jesper Jensen, Smørum (DK); Michael Syskind Pedersen, Smørum (DK)

(73) Assignee: OTICON A/S, Smørum (DK)

( * ) Notice: Subject to any disclaimer, the term of this patent is extended or adjusted under 35 U.S.C. 154(b) by 0 days.

(21) Appl. No.: 18/647,406

(22) Filed: Apr. 26, 2024

(65) Prior Publication Data

US 2024/0298122 A1 Sep. 5, 2024

Related U.S. Application Data

(63) Continuation of application No. 17/831,807, filed on Jun. 3, 2022, now Pat. No. 12,003,920.

(30) Foreign Application Priority Data

Jun. 4, 2021 (EP) .................................... 21177675

(51) Int. Cl.
*H04R 25/00* (2006.01)

(52) U.S. Cl.
CPC ................................. *H04R 25/505* (2013.01)

(58) Field of Classification Search
CPC .... H04R 25/505; H04R 25/507; H04R 25/35; H04R 3/00
See application file for complete search history.

(56) References Cited

U.S. PATENT DOCUMENTS

2019/0066713 A1 2/2019 Mesgarani et al.
2020/0221236 A1 7/2020 Jensen et al.

(Continued)

FOREIGN PATENT DOCUMENTS

EP 3 694 229 A1 8/2020
WO WO 2020/049472 A1 3/2020

OTHER PUBLICATIONS

Aubreville et al., Deep Denoising for Hearing Aid Applications, ARXIV.org, XP081555638, May 3, 2018, (5 pages total).

(Continued)

*Primary Examiner* — Tuan D Nguyen
(74) *Attorney, Agent, or Firm* — Birch, Stewart, Kolasch & Birch, LLP

(57) ABSTRACT

A hearing aid comprises at least one input unit for providing at least one stream of samples of an electric input signal in a first domain; at least one encoder configured to convert said at least one stream of samples of the electric input signal in the first domain to at least one stream of samples of the electric input signal in a second domain; a processing unit configured to process said at least one electric input signal in the second domain, to provide a compensation for the user's hearing impairment, and to provide a processed signal as a stream of samples in the second domain; a decoder configured to convert said stream of samples of the processed signal in the second domain to a stream of samples of the processed signal in the first domain. The at least one encoder is configured to convert a first number of samples from said at least one stream of samples of the electric input signal in the first domain to a second number of samples in said at least one stream of samples of the electric input signal in the second domain. The decoder is configured to convert said second number of samples from said stream of samples of the processed signal in the second domain to said first number of samples in said stream of samples of the electric input signal in the first domain. The second number of samples is larger than the first number of samples. The at least one encoder is trained, and at least a part of said processing unit providing said compensation for the user's hearing impairment is implemented as a trained neural network. A method of operating a hearing aid is further (Continued)

disclosed. Thereby an improved hearing aid may be provided.

20 Claims, 11 Drawing Sheets

(56) References Cited

U.S. PATENT DOCUMENTS

| | | | |
|---|---|---|---|
| 2020/0260198 | A1 | 8/2020 | Andersen et al. |
| 2021/0074266 | A1 | 3/2021 | Lu et al. |

OTHER PUBLICATIONS

Extended European Search Report for European Application No. 22176328.7, dated Nov. 3, 2022.
Extended European Search Report issued in European Application No. 21177675.2, dated Nov. 24, 2021.
Lai et al., "A Deep Denoising Autoencoder Approach to Improving the Intelligibility of Vocoded Speech in Cochlear Implant Simulation," IEEE Transactions on Biomedical Engineering, vol. 64, No. 7, Jul. 2017, pp. 1568-1578.
Lazim Al-Taai et al., "Targeted Voice Enhancement by Bandpass Filter and Composite Deep Denoising Autoencoder," Key Laboratory of Modern Teaching Technology, Ministry of Education, Shaanxi Normal University, 2020, (6 pages total).
Shankar et al., "Efficient two-microphone speech enhancement using basic recurrent neural network cell for hearing and hearing aids", The Journal of the Acoustical Society of America, vol. 148, No. 1, XP12248812, Jul. 27, 2020, pp. 389-400.

LOW LATENCY HEARING AID

This application is a Continuation of copending application Ser. No. 17/831,807, filed on Jun. 3, 2022, which claims priority under 35 U.S.C. § 119(a) to Application No. 21177675.2, filed in Europe on Jun. 4, 2021, all of which are hereby expressly incorporated by reference into the present application.

The present disclosure relates to hearing devices, e.g. hearing aids, in particular to such devices configured to have a low delay in the processing of audio signals.

SUMMARY

A Hearing Aid

In an aspect of the present application, a hearing aid configured to be worn by a user is provided. The hearing aid comprises

- at least one input unit for providing at least one stream of samples of an electric input signal in a first domain, said at least one electric input signal representing sound in an environment of the hearing aid;
- at least one encoder configured to convert said at least one stream of samples of the electric input signal in the first domain to at least one stream of samples of the electric input signal in a second domain;
- a processing unit configured to process said at least one electric input signal in the second domain, to provide a compensation for the user's hearing impairment, and to provide a processed signal as a stream of samples in the second domain; and
- a decoder configured to convert said stream of samples of the processed signal in the second domain to a stream of samples of the processed signal in the first domain.

The at least one encoder may be configured to convert a first number of samples from said at least one stream of samples of the electric input signal in the first domain to a second number of samples in said at least one stream of samples of the electric input signal in the second domain. The decoder may be configured to convert said second number of samples from said stream of samples of the processed signal in the second domain to said first number of samples in said stream of samples of the electric input signal in the first domain. The second number of samples may be larger than the first number of samples. The at least one encoder may be trained (e.g. optimized). At least a part of said processing unit providing said compensation for the user's hearing impairment may be implemented as a trained neural network.

Thereby an improved hearing aid may be provided.

The encoder(s) and decoder are configured to convert said signals from the first to the second domain and from the second to the first domain, respectively, in batches of N1→N2 samples and N2→N1 samples, respectively, N1 and N2 being the first and second number of samples, respectively.

The encoder/decoder (e.g. parameters thereof) may be trained (e.g. optimized). The processing unit may be implemented as a trained neural network. The encoder (or encoder/decoder) and the neural network implementing the processing unit (or at least the part that compensates for the user's hearing impairment) may be jointly trained (in a common training procedure, e.g. with a single cost function). The trained encoder/decoder framework may learn information about frequency content, but the encoded channels are not necessarily specifically assigned to a particular frequency band, as the encoded "basis functions" as well may contain information across frequency and time, such as e.g. modulation. FIG. 3C shows an example of how a basis function may look like. Each basis function may correlate with specific features in the input signal. It may e.g. be speech specific features such as onsets, pitch, modulation, frequency specific features or certain waveforms. Typically, the basis functions will be trained on different output signals. The basis functions may e.g. be trained in order to achieve a decoded hearing loss-compensated signal in order to implement a low-latency hearing loss compensation, as proposed by the present disclosure.

The processing unit is configured to run one or more processing algorithms to improve the electric input signal in the second domain. The one or more processing algorithms may comprise a hearing loss compensation algorithm, a noise reduction algorithm (e.g. including a beamformer, and possibly a postfilter), a feedback control algorithm, etc., or a combination thereof.

The term 'neural network' or 'artificial neural network' may cover any type of artificial neural network, e.g. feed forward, recurrent, long/short term memory, gated recurrent unit (GRU), convolutional, etc.

The decoder may e.g. form part of the processing unit.

The encoder may e.g. implement a Fourier transform with a zero-padded input.

The second number (N2) of samples may be more than twice as large as the first number (N1) of samples. The second number (N2) of samples may be more than 5 times as large as the first number (N1) of samples. The second number (N2) of samples may be more than 10 times as large as the first number (N1) of samples.

The first domain may be the time domain.

Typically, when applying a Fourier transform, it corresponds to multiplying the N input samples by an N×N DFT matrix, i.e. X=Wx, where W=N×N, and x=N×1 and hence X=N×1. The "basis functions" related to the DFT matrix are illustrated in the Wikipedia link on the topic of 'DFT matrix' related to 'depicting' the DFT as a matrix multiplication: link: https://en.wikipedia.org/wiki/DFT_matrix (accessed on 30 May 2022).

In the case, where the size of the DFT matrix is larger than the N input samples, the input samples can be zero-padded.

A transform according to the present disclosure may be different from a Fourier transform in that the transformation matrix G according to the present disclosure is an N2×N1 matrix, where N2>N1, such that the transformed signal is S=Gs, where G=N2×N1, s=N1×1 and S=N2×1, where s is the original (e.g. time domain) signal and G is the transform (related to encoding). Thereby the inverse transformation matrix $G^{-1}$ (related to decoding) may be written as a N1×N2 matrix, such that the inversely transformed signal is $s=G^{-1}S$.

FIG. 3C schematically illustrates an example of the basis functions of the transformation matrix G.

In the Fourier transform, each basis function contains a certain frequency. A Fourier transform may be seen as a special case of basis functions, where each basis function is a complex sine wave. By correlating each sine wave with the input signal, it is possible to find the frequencies contained in the input signal.

In a same way, each basis function according to the present disclosure may be "correlated with the input signal", and in a similar way we can determine how well each basis function "correlates" with the input signal.

The at least one input unit may comprise an input transducer for converting the sound to the stream of samples of the electric input signal representing the sound in the first domain. The input transducer may comprise an analogue to digital converter to digitize an analogue electric input signal to a stream of audio samples. The input transducer may comprise a microphone (e.g. a 'normal' microphone configured to convert vibrations in air to an electric signal).

The encoder and/or the decoder may be implemented as a neural network, or as respective neural networks, or respective parts of a neural network. The encoder and/or the decoder may (each) be implemented as a feed forward neural network.

The at least one encoder and the processing unit may be configured to be optimized jointly in order to process the at least one electric input signal optimally under a low-latency constraint. The processing unit may comprise (or be constituted by) a neural network. The encoder may convert the first number (N1) of samples in the first domain to the second number (N2) of samples in the second domain. The second number (N2) of samples in the second domain may constitute at least a part of an input vector to the neural network (of the processing unit). The neural network (of the processing unit) may provide an output vector comprising the second number (N2) of samples in the second domain. The decoder may convert the second number (N2) of samples in the second domain to the first number (N1) of samples in the first domain.

The at least one encoder, the processing unit and the decoder may be configured to be optimized jointly in order to process the at least one electric input signal optimally under a low-latency constraint. The low-latency constraint may e.g. be implemented via a loss function in an optimization criterion, such that the error is minimized when the waveform of the output sound is "time aligned" with the waveform of the desired output sound.

An encoder and a decoder having been jointly optimized with the processing unit of the hearing aid under a low-latency constraint is termed a low-latency encoder and a low-latency decoder, respectively.

The low-latency constraint may e.g. be related to (a restriction to the) the processing time through the hearing device. The low-latency constraint may e.g. be related to the processing time through the encoder, the processing device and the decoder. The larger input frame, the higher latency through the hearing device. Thus, a constraint on the input frame size will enable a shorter latency through the hearing device.

Typically, when input frames are short (comprising relatively few audio samples), a filter bank will only obtain a limited frequency resolution. An advantage of the present invention is that by mapping short input frames into a high-dimensional space of basis-functions, allows a high-resolution modification of frequencies, e.g. according to the prescription obtained from an audiogram (and perhaps additional inputs), to be achieved.

The hearing aid (according to the present disclosure comprising an encoder/decoder combination) may be configured to have a maximum delay of 1 ms, such as 5 ms or such as 10 ms.

Parameters that participate in the (e.g. joint) optimization (training) may for the neural network include one or more of the weight-, bias-, and non-linear function-parameters of the neural network. Parameters that participate in the optimization during training may for the encoder and/or decoder include one or more of the first and second number of samples.

The at least one encoder/decoder combination may e.g. be configured to implement a linear transformations (such as a matrix multiplication).

The at least one encoder/decoder combination may e.g. contain one or more non-linear transformations (e.g. a neural network).

At least a part of the (functionality of the) processing unit may be implemented as a recurrent neural network (e.g. a GRU).

Parameters of the at least one encoder, the processing unit, and optionally the decoder may be trained in order to minimize a cost function given by the difference to a hearing device comprising linear filter banks instead of said at least one encoder and said decoder. The at least one encoder, the processing unit, and optionally the decoder may be trained together to provide optimized parameters of separate neural networks implementing the at least one encoder, the processing unit, and the decoder.

The hearing aid may comprise an output unit for providing stimuli perceivable as sound to the user based on the stream of samples of the processed signal in the first domain.

The hearing aid may comprise at least one earpiece configured to be worn at or in an ear of the user; and a separate audio processing device.

The earpiece and the separate audio processing device may be configured to allow an exchange of audio signals or parameters derived therefrom between each other (e.g. via a wired or wireless link).

The separate audio processing device may be portable, e.g. wearable.

The earpiece and the separate audio processing device may comprise respective transceivers allowing the establishment of a wireless communication link between them, e.g. a wireless audio communication link. The communication link may be based on any appropriate (e.g. short range), proprietary or standardized, communication technology, e.g. Bluetooth or Bluetooth Low Energy, Ultra-WideBand (UWB), NFC, etc.

The earpiece may comprise said at least one input unit; and said output unit.

The earpiece may comprise at least one input transducer, e.g. a microphone. The earpiece may comprise at least two input transducers, e.g. microphones.

The separate audio processing device may comprise the processing unit.

The separate audio processing device may comprise the encoder.

The earpiece may comprise the, or an, encoder. The earpiece and the separate audio processing device may comprise (possibly identical) encoder units. Thereby the transmission from the separate audio processing device to the earpiece can be limited to appropriate gains (representing attenuation of amplification of the (encoded) electric input signal in the second domain) for application to the stream of samples of the electric input signal in a second domain (in the earpiece).

The earpiece may comprise the decoder.

The separate audio processing device may comprise the decoder.

The output unit may comprise a number of electrodes of a cochlear implant type hearing aid, or a vibrator of a bone conducting hearing aid, or a loudspeaker of an air conduction-based hearing aid.

The hearing device (e.g. a hearing aid) may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing device may comprise a signal processor for enhancing the input signals and providing a processed output signal.

The hearing device may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid).

The hearing device may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing device may comprise a directional microphone system adapted to spatially filter sounds from the environment, and thereby enhance a target acoustic source among a multitude of acoustic sources in the local environment of the user wearing the hearing device. The directional system may be adapted to detect (such as adaptively detect) from which direction a particular part of the microphone signal originates. This can be achieved in various different ways as e.g. described in the prior art. In hearing devices, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing device may comprise antenna and transceiver circuitry allowing a wireless link to an entertainment device (e.g. a TV-set), a communication device (e.g. a telephone), a wireless microphone, or another hearing device, etc. The hearing device may thus be configured to wirelessly receive a direct electric input signal from another device. Likewise, the hearing device may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing device can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing device and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology), or Ultra-WideBand (UWB) technology.

The hearing device may be or form part of a portable (i.e. configured to be wearable) device, e.g. a device comprising a local energy source, e.g. a battery, e.g. a rechargeable battery. The hearing device may e.g. be a low weight, easily wearable, device, e.g. having a total weight less than 500 g (e.g. a separate processing device of the hearing aid), e.g. less than 100 g, such as less than 20 g, such as less than 5 g (e.g. an earpiece of the hearing aid).

The hearing device may comprise a 'forward' (or 'signal') path for processing an audio signal between an input and an output of the hearing device. A signal processor may be located in the forward path. The signal processor may be adapted to provide a frequency dependent gain according to a user's particular needs (e.g. hearing impairment). The hearing device may comprise an 'analysis' path comprising functional components for analyzing signals and/or controlling processing of the forward path. Some or all signal processing of the analysis path and/or the forward path may be conducted in the frequency domain, in which case the hearing device comprises appropriate analysis and synthesis filter banks. Some or all signal processing of the analysis path and/or the forward path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing device may comprise an analogue-to-digital (AD) converter to digitize an analogue input (e.g. from an input transducer, such as a microphone) with a predefined sampling rate, e.g. 20 kHz. The hearing devices may comprise a digital-to-analogue (DA) converter to convert a digital signal to an analogue output signal, e.g. for being presented to a user via an output transducer.

The hearing device, e.g. the input unit, and or the antenna and transceiver circuitry may comprise a transform unit for converting a time domain signal to a signal in the transform domain (e.g. frequency domain or Laplace domain, etc.). The transform unit may be constituted by or comprise a TF-conversion unit for providing a time-frequency representation of an input signal. The time-frequency representation may comprise an array or map of corresponding complex or real values of the signal in question in a particular time and frequency range.

The frequency range considered by the hearing device from a minimum frequency $f_{min}$ to a maximum frequency $f_{max}$ may comprise at least a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$.

The hearing device may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing device is reduced (e.g. to save power), e.g. to disable wireless communication, and/or to disable specific features of the hearing device.

The hearing device may comprise a number of detectors configured to provide status signals relating to a current physical environment of the hearing device (e.g. the current acoustic environment), and/or to a current state of the user wearing the hearing device, and/or to a current state or mode of operation of the hearing device. Alternatively or additionally, one or more detectors may form part of an external device in communication (e.g. wirelessly) with the hearing device. An external device may e.g. comprise another hearing device, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing device may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing device may comprise an own voice detector for estimating whether or not (or with what probability) a given input sound (e.g. a voice, e.g. speech) originates from the voice of the user of the system. A microphone system of the hearing device may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing device may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing device, or other properties of the current environment than acoustic);
b) the current acoustic situation (input level, feedback, etc.), and
c) the current mode or state of the user (movement, temperature, cognitive load, etc.);
d) the current mode or state of the hearing device (program selected, time elapsed since last user interaction, etc.) and/or of another device in communication with the hearing device.

The classification unit may be based on or comprise a neural network, e.g. a trained neural network.

The hearing device may comprise an acoustic (and/or mechanical) feedback control (e.g. suppression) or echo-cancelling system. Adaptive feedback cancellation has the ability to track feedback path changes over time. It is typically based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing device may further comprise other relevant functionality for the application in question, e.g. compression, noise reduction, etc.

The hearing device may comprise a hearing instrument, e.g. a hearing instrument adapted for being located at the ear or fully or partially in the ear canal of a user, e.g. a headset, an earphone, an ear protection device or a combination thereof. A hearing system may comprise a speakerphone (comprising a number of input transducers and a number of output transducers, e.g. for use in an audio conference situation), e.g. comprising a beamformer filtering unit, e.g. providing multiple beamforming capabilities.

Use

In an aspect, use of a hearing device, e.g. a hearing aid, as described above, in the 'detailed description of embodiments' and in the claims, is moreover provided. Use may be provided in a hearing system comprising one or more hearing aids (e.g. hearing instruments, e.g. a binaural hearing aid system), headsets, ear phones, active ear protection systems, etc., e.g. in handsfree telephone systems, teleconferencing systems (e.g. including a speakerphone), public address systems, karaoke systems, classroom amplification systems, etc.

A Method of Operating a Hearing Aid

In an aspect, a method of operating a hearing aid configured to be worn by a user is furthermore provided by the present application. The method comprises

- providing at least one stream of samples of an electric input signal in a first domain, said at least one electric input signal representing sound in an environment of the hearing aid;
- converting (encoding) said at least one stream of samples of the electric input signal in the first domain to at least one stream of samples of the electric input signal in a second domain;
- processing said at least one electric input signal in the second domain to provide a compensation for the user's hearing impairment, and providing a processed signal as a stream of samples in the second domain;
- converting (decoding) said stream of samples of the processed signal in the second domain to a stream of samples of the processed signal in the first domain; and
- providing stimuli perceivable as sound to the user based on said stream of samples of the processed signal in the first domain.

The method may further comprise

- converting (encoding) a first number of samples from said at least one stream of samples of the electric input signal in the first domain to a second number of samples in said at least one stream of samples of the electric input signal in the second domain, and
- converting (decoding) said second number of samples from said stream of samples of the processed signal in the second domain to said first number of samples in said stream of samples of the electric input signal in the first domain.

The second number of samples may be larger than the first number of samples. The encoding may be trained (e.g. optimized). The compensation for the user's hearing impairment may be provided by a trained neural network.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

A Method of Training (e.g. Optimizing) a Hearing Aid

In an aspect, a method of training parameters of hearing aid as described above, in the 'detailed description of embodiments' or in the claims is furthermore provided. The method comprises

- training parameters of a low-latency encoder-based hearing aid as described above, in the 'detailed description of embodiments' or in the claims in order to minimize the error at the output signal of a target hearing aid comprising a filter bank operating in the Fourier domain.

The term 'an error' at the output signal is in the present context taken to mean 'a difference' between the output of the low-latency encoder-based hearing aid and the output of the hearing aid comprising a filter bank operating in the Fourier domain.

In an aspect, a method of optimizing parameters of an encoder-/decoder-based hearing aid in order to minimize a difference between an output signal of a target encoder-/decoder-encoder-based hearing aid and an output signal of a filter bank-based hearing aid, is furthermore provided.

The encoder-/decoder-encoder-based hearing aid comprising a forward path comprises

- an encoder configured to convert a stream of samples of an electric input signal in a first domain to a stream of samples of the electric input signal in a second domain;
- a processing unit configured to process said at least one electric input signal in the second domain, to provide a compensation for the user's hearing impairment, and to provide a processed signal as a stream of samples in the second domain;
- a decoder configured to convert said stream of samples of the processed signal in the second domain to a first stream of samples of the processed signal in the first domain.

The filter bank-based hearing aid comprising a forward path comprises

- a filter bank operating in the Fourier domain, the filter bank comprising
  - an analysis filter bank for converting said stream of samples of the electric input signal in the first domain to a signal in the Fourier domain; and
  - a processing unit connected to the analysis filter bank and the synthesis filter bank and configured to process said signal in the Fourier domain to compensate for the user's hearing impairment and to provide a processed signal in the Fourier domain;
  - a synthesis filter bank for converting said processed signal in the Fourier domain to a second stream of samples of the processed signal in the first domain.

The method comprises

- providing said stream of samples of an electric input signal in a first domain, said at least one electric input signal representing sound in an environment of the target encoder-/decoder-encoder-based hearing aid and/or the filter bank-based hearing aid;
- minimizing a cost function given by the difference between said first and second stream of samples of the processed signal in the first domain to thereby optimize said parameters of the encoder-/decoder-based hearing aid (to provide the target encoder-/decoder-encoder-based hearing aid).

The method may be configured to provide that the parameters comprise one or more of weight-, bias-, and non-linear function-parameters of a neural network.

The method may be configured to provide that the parameters comprise one or more of the first and second number of samples.

The method may comprise

- providing a separate delay (D) in the forward path of the encoder-/decoder-based hearing aid in addition to the processing delay of the encoder, the processing unit and the decoder, wherein a delay parameter (D) is used to adjust for an intended latency difference between the target hearing aid and the encoder-based hearing aid.

The term 'parameters of a low-latency encoder-based hearing aid' may e.g. include the weights of the encoding matrix G (i.e. the transformation matrix), or in more general terms, the weights and biases of a neural network implementing the encoder (and possible other functional parts of the low-latency encoder-based hearing aid, e.g. a processor and/or a low-latency decoder).

The filter bank-based hearing aid hearing aid comprises a forward path comprising one or more microphones (as does the low-latency encoder-based hearing aid), one or more analysis filter banks for converting the respective microphone signals from the time domain to the frequency domain, a processing unit at least comprising a hearing loss compensation algorithm for compensating for a hearing impairment of the user and providing a processed signal, and a synthesis filter bank for converting the processed signal from the frequency domain to the time domain. The filter bank-based hearing aid and the encoder-/decoder-encoder-based hearing aid according to the present disclosure being trained (e.g. optimized) may be identical in input unit(s) and output unit. The filter bank-based hearing aid and the encoder-/decoder-encoder-based hearing aid according to the present disclosure being trained may be identical in overall functionality from a user-perspective (but not in delay).

Advantages of the proposed model is that the latency of the encoder-based hearing aid according to the present disclosure can be kept at a minimum compared to traditional hearing aid processing. Training towards a hearing aid wherein the delay is higher than what is typically allowed may be applied, if, e.g., the analysis filter bank has a higher frequency resolution than what is typically allowed in a hearing aid due to latency (e.g. >64 or 128 frequency bands in the forward path).

A delay parameter D may be used to adjust for the latency difference between the filter bank-based hearing aid and the encoder-based hearing aid. The delay parameter may be substituted with an all-pass filter allowing a frequency-dependent delay.

The encoder, the processing unit, and the decoder of the low-latency encoder-based hearing aid may be trained as one deep neural network, wherein the first layers of the deep neural network correspond to the encoder, and the last layers correspond to the decoder, and the layers in-between correspond to the hearing loss compensation processing. The neural network may be trained jointly. The encoder and decoder may be trained but be kept fixed for fine tuning to an individual audiogram (where only the layers in-between are trained, e.g. trained to the specific hearing loss of the user).

The encoder and decoder may be trained to specific hearing losses.

The encoder/decoder in a binaural hearing aid system may be the same (or different) in both hearing aids.

The encoder/decoder may be part of a binaural system, where the neural network is trained jointly, e.g., in order to preserve binaural cues.

A Computer Readable Medium or Data Carrier

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program

A computer program (product) comprising instructions which, when the program is executed by a computer, cause the computer to carry out (steps of) the method described above, in the 'detailed description of embodiments' and in the claims is furthermore provided by the present application.

A Data Processing System

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System

In a further aspect, a hearing system comprising a hearing device as described above, in the 'detailed description of embodiments', and in the claims, AND an auxiliary device is moreover provided.

The hearing system may be adapted to establish a communication link between the hearing device and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing device(s). The function of a remote control may be implemented in a smartphone, the smartphone possibly running an APP allowing to control the functionality of the hearing device or hearing system via the smartphone (the hearing device(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing device.

The auxiliary device may be constituted by or comprise another hearing device. The hearing system may comprise two hearing devices adapted to implement a binaural hearing system, e.g. a binaural hearing aid system.

A binaural hearing system comprising first and second hearing aids as described above, in the 'detailed description of embodiments' and in the claims is furthermore provided by the present application.

The binaural hearing system may be configured to provide that the separate audio processing device serve both of the first and second hearing aids. The first and second hearing aids may comprise first and second earpieces, respectively. The first and second earpieces may each comprise respective at least one encoder and a decoder. The separate audio processing device may comprise at least one encoder, and the processing unit, wherein the processing unit is configured to determine appropriate gains for application in the respective first and second earpieces to the respective stream of samples of the at least one electric input signal in the second domain, based on the at least one stream of samples of the electric input signal in the second domain from both of the first and second hearing devices.

The binaural hearing system may be embodied as shown in FIG. 7.

An APP

In a further aspect, a non-transitory application, termed an APP, is furthermore provided by the present disclosure. The APP comprises executable instructions configured to be executed on an auxiliary device to implement a user interface for a hearing device or a hearing system described above in the 'detailed description of embodiments', and in the claims. The APP may be configured to run on cellular phone, e.g. a smartphone, or on another portable device allowing communication with said hearing device or said hearing system.

The APP may comprise a Latency Configuration APP may allow a user to decide how the processing according to the present disclosure is configured. The user may indicate whether a monaural (Single Hearing Aid system) or a binaural system comprising left and right hearing aids is currently relevant. The user may further for a monaural system indicate whether the hearing aid is located at the left or right ear. The user may further indicate whether an external audio processing device should be used or not. The auxiliary device and the hearing aid or hearing aids may be adapted to allow communication between them of data representative of the currently selected configuration via a, e.g. wireless, communication link.

Definitions

In the present context, a hearing aid, e.g. a hearing instrument, refers to a device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing aid may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing aid may comprise a single unit or several units communicating (e.g. acoustically, electrically or optically) with each other. The loudspeaker may be arranged in a housing together with other components of the hearing aid, or may be an external unit in itself (possibly in combination with a flexible guiding element, e.g. a dome-like element).

A hearing aid may be adapted to a particular user's needs, e.g. a hearing impairment. A configurable signal processing circuit of the hearing aid may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing aid via an interface to a programming device (fitting system), and used by a processing algorithm executed by the configurable signal processing circuit of the hearing aid.

A 'hearing system' refers to a system comprising one or two hearing aids, and a 'binaural hearing system' refers to a system comprising two hearing aids and being adapted to cooperatively provide audible signals to both of the user's ears. Hearing systems or binaural hearing systems may further comprise one or more 'auxiliary devices', which communicate with the hearing aid(s) and affect and/or benefit from the function of the hearing aid(s). Such auxiliary devices may include at least one of a remote control, a remote microphone, an audio gateway device, an entertainment device, e.g. a music player, a wireless communication device, e.g. a mobile phone (such as a smartphone) or a tablet or another device, e.g. comprising a graphical interface. Hearing aids, hearing systems or binaural hearing systems may e.g. be used for compensating for a hearing-impaired person's loss of hearing capability, augmenting or protecting a normal-hearing person's hearing capability and/or conveying electronic audio signals to a person. Hearing aids or hearing systems may e.g. form part of or interact with public-address systems, active ear protection systems, handsfree telephone systems, car audio systems, entertainment (e.g. TV, music playing or karaoke) systems, teleconferencing systems, classroom amplification systems, etc.

Embodiments of the disclosure may e.g. be useful in applications such as hearing aids and headsets.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Figure 1:
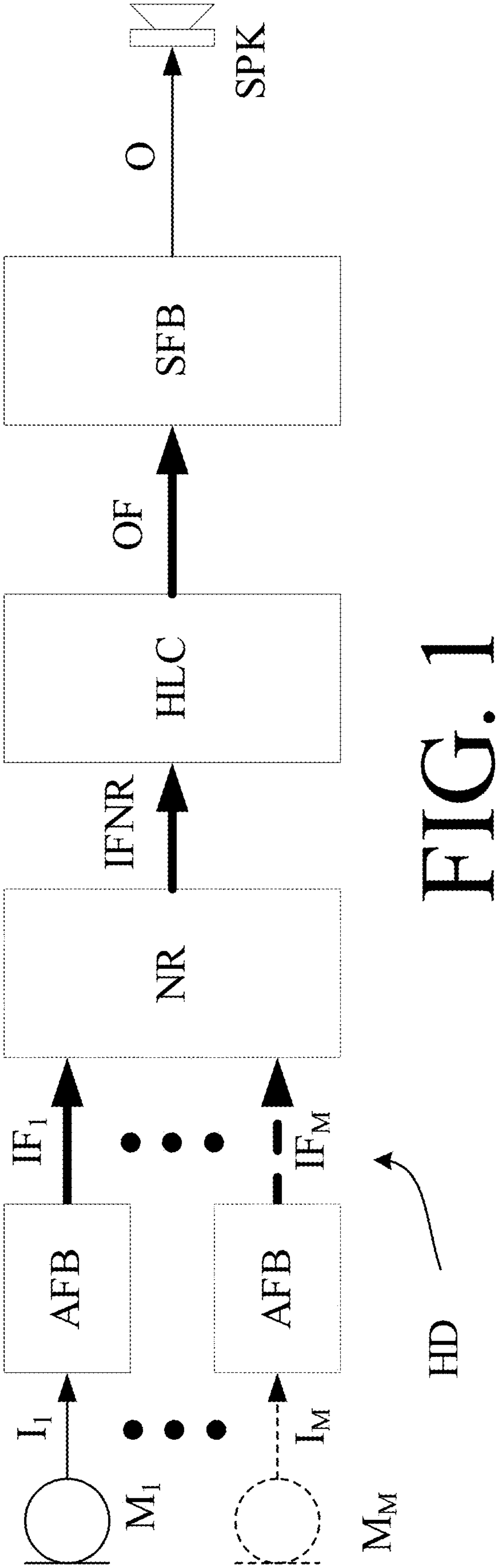
FIG. 1 shows a hearing device configured to process signals in the frequency domain.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing devices. The disclosure relates in particular to such devices configured to have a low delay in the processing of audio signals.

[Luo et al.; 2019] describe a scheme for speaker-independent speech separation using a fully convolutional time-domain audio separation network in a deep learning framework (DNN) for end-to-end time-domain speech separation. The DNN uses a linear encoder to generate a representation of the speech waveform optimized for separating individual speakers. Speaker separation is achieved through application of a set of weighting functions (masks) to the encoder output. The modified encoder representations are then inverted back to the waveforms using a linear decoder. The masks are found using a temporal convolutional network (TCN) consisting of stacked 1-D dilated convolutional blocks, which allows the network to model the long-term dependencies of the speech signal while maintaining a small model size.

FIG. 1 shows a hearing device (HD'), e.g. a hearing aid, configured to process signals in the frequency domain. The time domain signal(s) ($I_1, \ldots, I_M$, $M \geq 1$) picked up by the microphone(s) ($M_1, \ldots, M_M$) are converted into the time-frequency domain (signals $IF_1, \ldots, IF_M$), using an analysis filter bank (AFB). In the frequency domain, the signal is modified in order to compensate for a hearing loss of the user (cf. unit HLC, and output signal OF), and possibly also processed in order to enhance speech in a noisy background (e.g. by reducing noise in the input signal(s) ($IF_1, \ldots, IF_M$), cf. block NR, and output signal IFNR). The purpose of the NR block is to reduce the background noise in order to enhance a target signal. The noise is typically attenuated using beamforming and/or by attenuating regions in time and frequency wherein the signal to noise ratio (SNR) is estimated to be poor. The processed signal (OF) is converted to the time-domain by a synthesis filter bank (SFB) and the resulting time-domain signal (O) is presented to the user via an output transducer (here a loudspeaker (SPK)).

In the block diagram of a hearing instrument (HD') shown in FIG. 1, the microphone signal(s) ($I_1, \ldots, I_M$) are processed in the frequency domain in order to provide a frequency dependent gain (e.g. to provide a hearing loss compensation for the user of the hearing instrument). Frequency domain processing typically requires filtering. The filters (analysis+synthesis filters, AFB, SFB) have a certain length, and hereby a delay is introduced in the processing path. As a rule of thumb, a higher frequency resolution requires a longer filter, and hereby a higher delay through the hearing instrument.

There is however a limit to how much latency a hearing device can introduce before the processed sound is significantly degraded. Typically, delays exceeding approximately 10 milliseconds (ms) are unacceptable during daily hearing device use.

Figure 2:
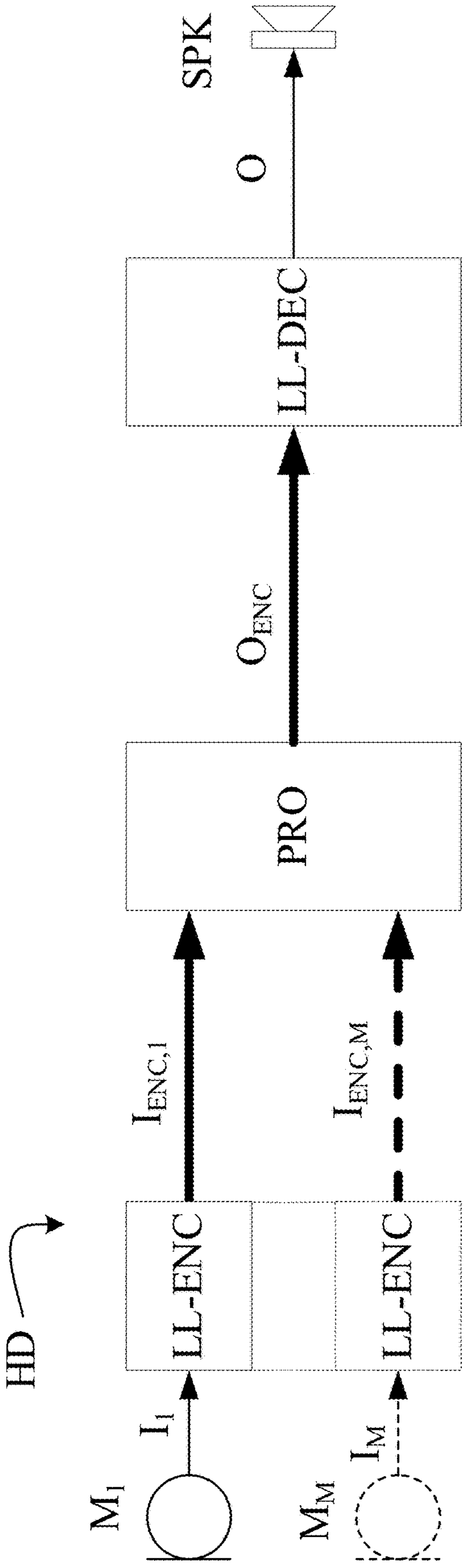
FIG. 2 shows an embodiment of a hearing device according to the present disclosure.

FIG. 2 shows an embodiment of a hearing device (HD), e.g. a hearing aid, according to the present disclosure. FIG. 2 shows an embodiment of the proposed hearing device structure: The analysis and synthesis filter bank (AFB, SFB) of FIG. 1 are replaced with a more generic low-latency encoder/decoder (LL-ENC, LL-DEC). The low-latency encoder (LL-ENC) takes in few samples at a time, which via the encoder are mapped into a high-dimensional space. The LL-ENC for each microphone may contain the same set of optimized parameters. The input is processed (in processing unit (PRO)) in the high dimensional space before it is synthesized back into a time-domain signal by low-latency decoder (LL-DEC) and presented to the listener by an output transducer (here a loudspeaker (SPK)). The system is optimized jointly in order to process the input optimally under the low-latency constraint (i.e. apply hearing loss compensation and noise reduction, e.g. provided by the processing unit (PRO)). It is noted, though, that the decoder (LL-DEC) is not required to perfectly reconstruct the time-domain signal.

The LL decoder (LL-DEC) may be jointly optimized together with the processing unit (as the processing unit will typically alter the input signal). As it rarely happens that the input signal is unaltered by the processing unit, a requirement of perfect reconstruction may be unnecessary (and the parameters of the encoder and the decoder may be utilized in a better way).

Similarly to an analysis filter bank (AFB in FIG. 1), the low-latency encoder (LL-ENC) is mapping time domain samples into another domain. However, instead of mapping the samples into a Fourier domain, the time domain samples are mapped into a high-dimensional domain. E.g. a time frame consisting of e.g. T=20 samples at a sample rate of 20 kHz is encoded into a high-dimensional domain, e.g. consisting of N=200 values. This is schematically illustrated in FIG. 3A, 3B.

Figure 3A:
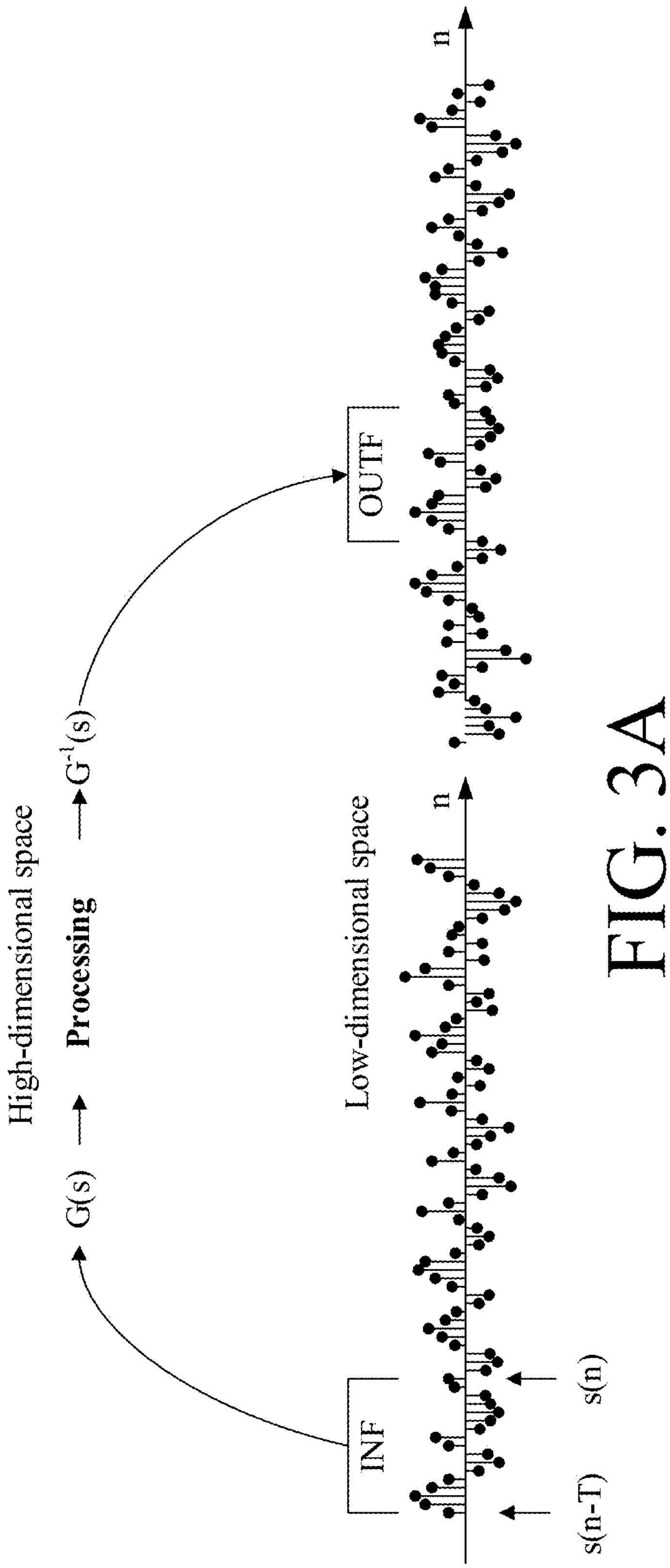
FIG. 3A shows an example of an encoder/decoder function according to the present disclosure.
Figure 3B:
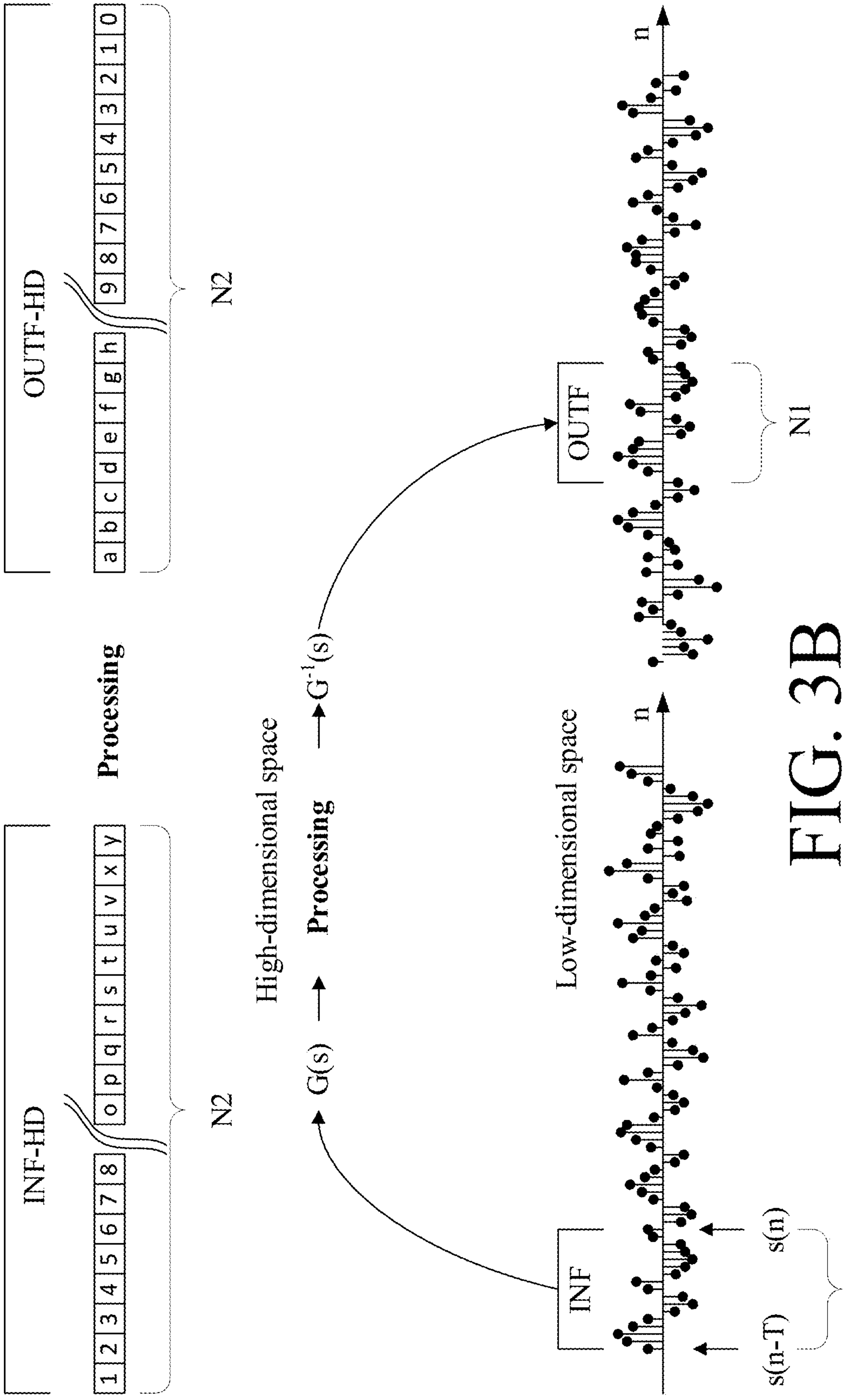
FIG. 3B, shows the example of FIG. 3A in more detail where the transformation matrix G converts 20 samples to 200 values (encoding), and the inverse transformation matrix $G^{-1}$ converts the 200 values back into 20 samples (decoding), and FIG. 3C schematically illustrates an example of the basis functions of the transformation matrix G.

FIG. 3A, 3B shows an example of the function of an encoder/decoder according to the present disclosure. The bottom part of FIG. 3A, 3B represents the low-dimensional space (here the time-domain), whereas the top part of FIG. 3A, 3B represents the high-dimensional space. The left half of bottom part of FIG. 3A, 3B shows a stream of input audio samples, whereas the right half of bottom part of FIG. 3A, 3B shows a stream of (processed) output audio samples. A frame (denoted INF in FIG. 3A, 3B) of time domain samples (cf. left square bracket embracing T (e.g. N1) samples from s(n−T) to s(n) in the input stream of audio samples in the lower part of FIG. 3A, 3B, n being a time sample index) is encoded into a high-dimensional space. For example, T=20 samples are encoded into a high-dimensional space, e.g. to (N2=) N=200 values, using the encoding function G(s), cf. arrow from the square bracket (INF) to 'G(s)'. The input signal (stream) is processed in this high-dimensional space (cf. 'Processing' in the top part of FIG. 3) before being decoded (using the decoding function $G^{-1}$(.)) back to a time domain signal (cf. arrow from $G^{-1}$(.) to square bracket denoted OUTF in the output stream of time domain samples. As the input frame (INF) is based on only few samples, the latency between the encoding and decoding is kept at a minimum. The size of the output frame may be similar to the size of the input frame. The frames may overlap in time.

FIG. 3B, shows the example of FIG. 3A in more detail where the transformation matrix G converts N1=20 samples to N2=200 values (encoding), and the inverse transformation matrix $G^{-1}$ converts the N2=200 values back into N1=20 samples (decoding). In FIG. 3B, the input and output frames (INF-HD, OUTF-HD) of the high-dimensional spaces are specifically illustrated.

Figure 3C:
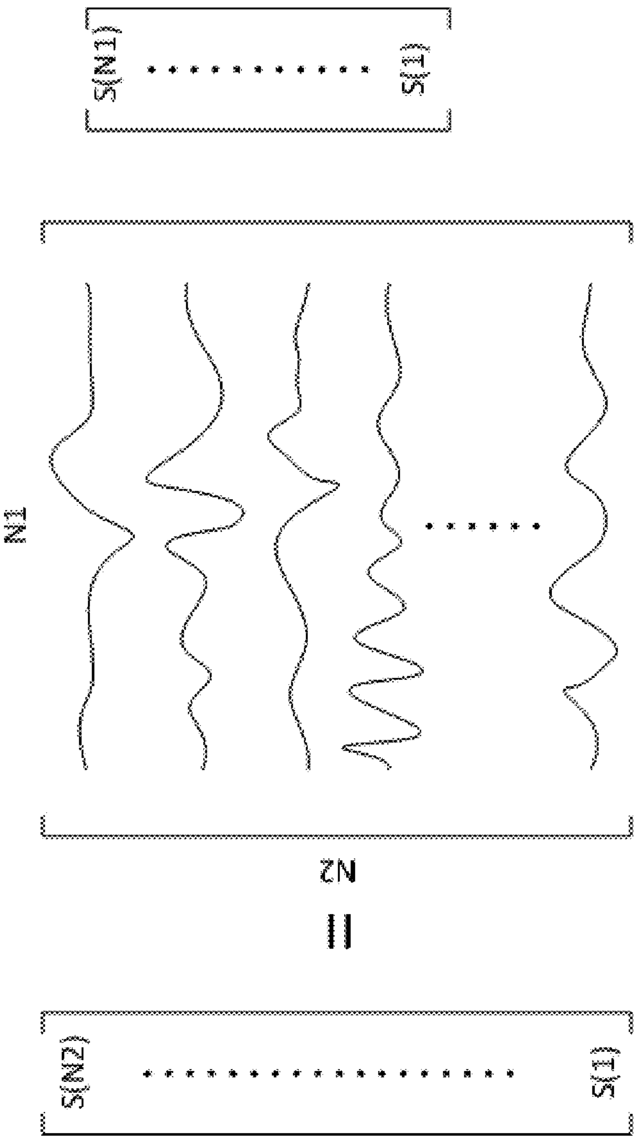

FIG. 3C schematically illustrates an example of the basis functions of the transformation matrix G. Each basis function may correlate with specific features in the input signal. It may e.g. be speech specific features such as onsets, pitch, modulation, frequency specific features or certain waveforms. Typically, the basis functions will be trained on different output signals. The basis functions may e.g. be trained in order to achieve a decoded hearing loss-compensated signal in order to implement a low-latency hearing loss compensation, as proposed by the present disclosure.

A transform according to the present disclosure may be different from a Fourier transform in that the transformation matrix (G, related to encoding according to the present disclosure) is an N2×N1 matrix (cf. FIG. 3C), where N2>N1, such that the transformed signal is S=Gs, where G=N2×N1, s=N1×1 and S=N2×1, where s is the original (e.g. time domain) signal. Thereby the inverse transformation matrix $G^{-1}$ (related to decoding) may be written as a N1×N2 matrix, such that the inversely transformed signal is $s=G^{-1}S$.

The encoding/decoding functions may be linear, e.g. G(s) could be an N×T matrix, and the decoding function could be a T×N matrix, where N≥T (T being the number of samples in an input frame). A DFT (Discrete Fourier Transform) matrix is a special case of such an encoding function. The encoding/decoding functions may as well be non-linear, e.g. implemented as a neural network, e.g. as a feed-forward neural network. The neural network may be a deep neural network. Perfect reconstruction (i.e. $GG^{-1}=I$, where I is a T×T identity matrix) is not a requirement.

The encoding step may be written as a matrix multiplication:

$$z=G(s)=f(sU),$$

where U is a T×N matrix, and f is an optional non-linear function.

Similarly, $G^{-1}(z)=h(zW)$, where W is an N×T matrix, and h is an optional non-linear function.

Figure 5:
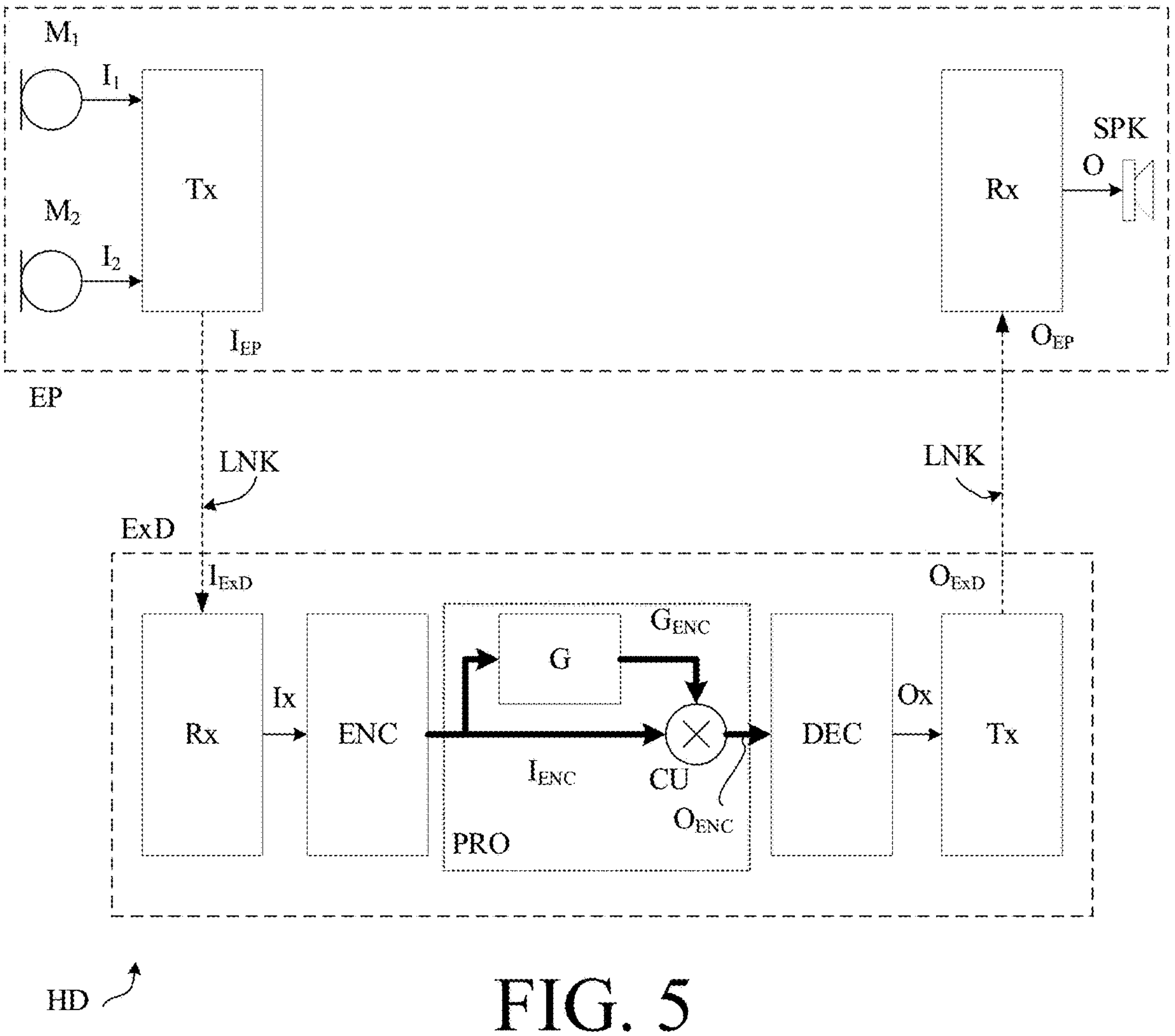
FIG. 5 shows an example of a hearing device according to the present disclosure comprising an earpiece and a separate (external) audio processing device wherein a low-latency encoder may allow processing in the external audio processing device.

Some examples exist in literature on the decomposition of speech into a high-dimensional space of basis vectors (i.e. basis functions), see e.g. an illustration of basis function examples in FIG. 5 of [Lewicki & Sejnowski; 2000], or in FIG. 2 of [Bell & Sejnowski; 1996]. This encoding can be trained using independent component analysis or a more general approach by using a neural network (cf. [Luo et al.; 2019]).

Figure 4:
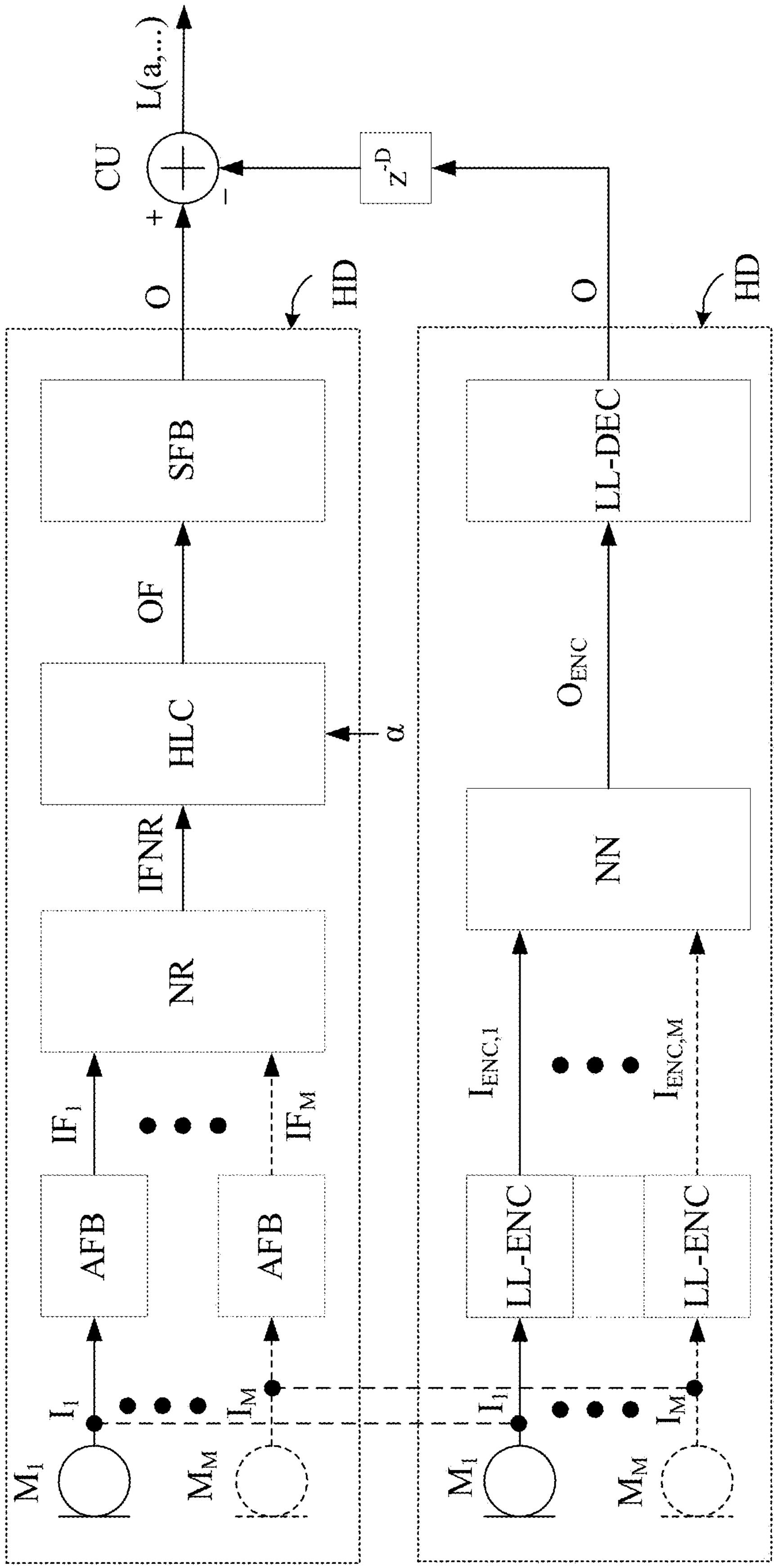
FIG. 4 shows an embodiment of a hearing device according to the present disclosure, wherein parameters of the encoder/processing/decoder are trained in order to minimize a cost function given by the difference to a regular hearing instrument with linear filter banks and a hearing loss compensation and (optional) noise reduction.

A main concept of the present disclosure is shown in FIG. 4. FIG. 4 shows an embodiment of a hearing device (HD, excl. output transducer of FIG. 2), e.g. a hearing aid, according to the present disclosure (bottom part of FIG. 4), wherein parameters of the encoder/processing/decoder (are trained in order to minimize a cost function (cf. error L(α, . . . ) in FIG. 4) given by the difference to a regular hearing instrument (HD', excl. output transducer of FIG. 1) with linear filter banks (AFB, SFB) and a hearing loss compensation (HLC) and (optional) noise reduction (NR) units (top part of FIG. 4). The error signal L(α, . . . ) is provided by combination unit (CU) here a subtraction unit ('+') subtracting the output (O') of the prior art hearing aid (HD') from the output (O) of the hearing aid (HD) according to the present disclosure. The hearing loss compensation (HLC) is a function of the hearing ability of the user (e.g. an audiogram) parameterized by input a to the HLC-block The low latency encoder (LL-ENC) may encode the microphone signals ($I_1, \ldots, I_M$) jointly or separately, depending on how the neural network (NN) (representing the processing unit (PRO) of the embodiment of FIG. 2) is structured.

It is thus proposed to train the parameters in a low-latency encoder/decoder hearing aid (FIG. 2) according to the present disclosure in order to minimize the difference ('error') ($L(\alpha, \ldots)$ in FIG. 4) at the output signal (O') of a regular hearing aid (HD') with a filter bank (AFB, SFB) operating in the Fourier domain (cf. combination unit 'CU', here performing a subtraction of the (possibly delayed (cf. delay unit $z^{-1}$)) output of the low-latency encoder/decoder hearing aid from the output of the regular hearing aid comprising a filter bank (AFB, SFB)).

Advantages of the proposed model is that the latency of the encoder/decoder-based hearing aid (HD) can be kept at a minimum compared to traditional hearing aid (HD') processing. It may even allow training towards a hearing aid wherein the delay (of the corresponding filter bank-based hearing aid) is higher than what is typically allowed (e.g. >10 ms, e.g. ≥15 ms). E.g., the analysis filter bank (AFB) may have a higher frequency resolution than what is typically allowed in a hearing aid due to latency. Such a higher resolution will e.g. allow attenuation of noise between the harmonic frequencies of a speech signal.

The delay parameter D (cf. delay element $z^{-D}$ inserted in the signal path between the low latency decoder (LL-DEC) and the combination unit (CU)) is used to adjust for the latency difference between the filter bank-based hearing aid and the encoder-based hearing aid (to thereby train towards a hearing aid having a lower latency while exhibiting the benefits of a larger delay (e.g. increased frequency resolution) in the filter bank-based hearing aid). The delay parameter may be substituted with an all-pass filter allowing a frequency-dependent delay. The encoder-based hearing aid (HD) may be trained as one deep neural network, wherein the first layers correspond to the encoder, and the last layers correspond to the decoder. Layers in-between correspond to the noise reduction and hearing loss compensation processing. The network may be trained jointly. In an embodiment the encoder and decoder are trained but may be kept fixed for fine tuning to an individual audiogram (where only the layers in-between are trained). The layers corresponding to the low-latency-encoder and/or of the low-latency-decoder may e.g. be implemented as a feed forward neural network. The layers corresponding to the hearing loss compensation (etc.) may e.g. be implemented as a recurrent neural network.

In the exemplary training setup of FIG. 4, the two hearing aid processing schemes (HD', HD) that are compared each have from 1 to M microphones ($M_1, \ldots, M_M$). M may be one or more, two or more, such as three or more, etc. In the training situation, identical audio data are fed to the two 'hearing aids', e.g. from a database, either by playing identical sound signals to (identical microphone configurations $M_1, \ldots, M_M$) of the two hearing aids, or by feeding received signals $I_1, \ldots, I_M$ from one hearing aid to the other, or by feeding electrical versions of the sound signals directly to the analysis filter bank(s) and low-latency-encoder(s), respectively. This is indicated by the dashed lines combining the respective input signals $I_1, \ldots, I_M$ of the two hearing aids (HD', HD).

The main objective of the training is to provide that the low-latency hearing instrument in the lower part of FIG. 4 mimics the performance of the (conventional) hearing aid in the upper part of FIG. 4.

Figure 6:
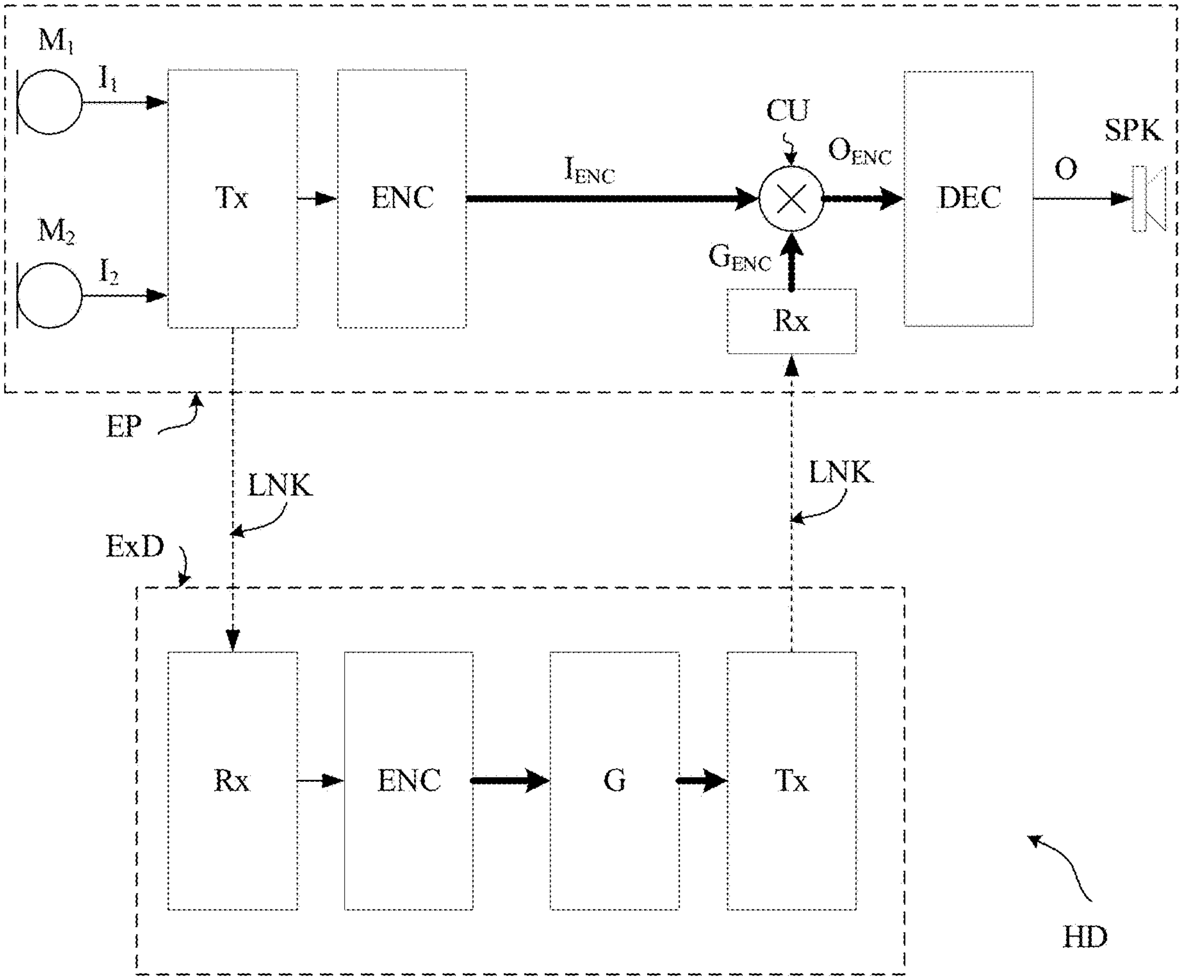
FIG. 6 shows an example of a hearing device according to the present disclosure comprising a similar functional configuration as in FIG. 5, but wherein only parts of the signal processing are moved to the external audio processing device.
Figure 7:
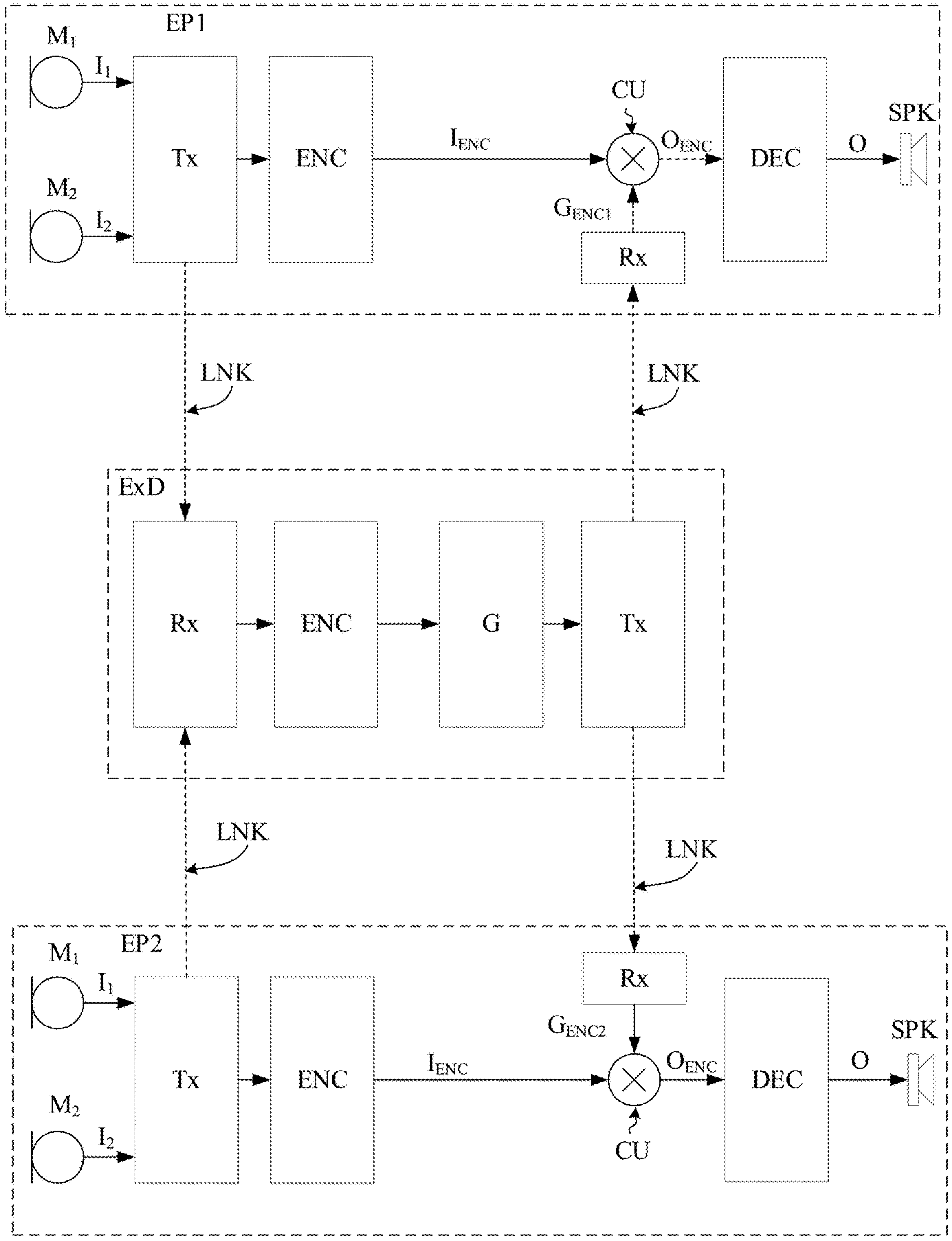
FIG. 7 shows an example of a binaural hearing system according to the present disclosure wherein the estimated gains may depend on signals from both hearing devices in a binaural hearing aid system.

The gained lower latency may be used to compensate for an additional transmission delay, in the case the signals or encoded features partly or fully are processed in an external device. The external device may contain additional microphones, or it may base its calculations on signals from more than one hearing aid, such as a pair of hearing aids mounted on the left and the right ear. Different examples are shown in FIG. 5, FIG. 6, and FIG. 7.

FIG. 5 shows an example of a hearing device (HD), e.g. a hearing aid, according to the present disclosure comprising an earpiece (EP) adapted for being located at or in an ear of the user and a separate (external) audio processing device (ExD), e.g. adapted for being worn by the user, wherein a low-latency encoder (LL-ENC) may allow processing in the external audio processing device (ExD). The earpiece (EP) of the embodiment of FIG. 5 comprises two microphones ($M_1$, $M_2$) for picking up sound at the earpiece (EP) and providing respective electric input signals ($I_1$, $I_2$) representing the sound. Input signals, e.g. signals $I_1$, $I_2$), or a representation thereof, e.g. a filtered (e.g. beamformed) version thereof, are transmitted from the earpiece (EP) (cf. transmitted signal $I_{EP}$) to the external audio processing device (ExD) (cf. received signal $I_{ExD}$) via a (wired or wireless) communication link (LNK) provided by transceivers (transmitters (Tx) and receivers (Rx)) of the respective devices (EP, ExD). The receiver (Rx) of the external audio processing device (ExD) provides input signal (or signals) Ix to low-latency encoder (or encoders) (LL-ENC) according to the present disclosure. The low-latency encoder (or encoders) (LL-ENC) provides input signal(s) $I_{ENC}$ in a high-dimensional space. The input signal(s) $I_{ENC}$ is(are) fed to the processing unit (PRO, cf. dotted enclosure). The processing unit (PRO) may e.g. comprise a hearing loss compensation algorithm (and/or other audio processing algorithms for enhancing the input signal(s), e.g. performing beamforming and/or other noise reduction). In the embodiment of FIG. 5, the processing unit (PRO) comprises gain unit (G) for determining appropriate gains $G_{ENC}$ (e.g. for compensating for a hearing loss of the user, etc.) that are applied to the input signal $I_{ENC}$ in combination unit ('X'), e.g. a multiplication unit. The combination unit (CU) (and here the processing unit (PRO)) provides processed signal $O_{ENC}$. The processed signal is fed to the low-latency decoder (LL-DEC) providing processed (time-domain) output signal $O_x$, which is provided to transmitter Tx for transmission to the earpiece (EP) via wireless link (LNK), cf. transmitted signal $O_{ExD}$ and received signal $O_{EP}$. The receiver (Rx) of the earpiece (EP) provides (time-domain) output signal (O) to the output transducer (here loudspeaker SPK) of the earpiece. The output signal (O) is presented as stimuli perceivable by the user as sound (her as vibrations in air to the user's eardrum).

The thereby provided lower latency of processing (cf. processing unit PRO in dotted enclosure of the external audio processing device (ExD)) may compensate for the transmission delay incurred by the communication link (LNK) between the earpiece (EP) of the hearing instrument and the external audio processing device (ExD). Hereby the hearing instrument (HD) has access to more processing power compared to local processing in the earpiece (EP), e.g. to better enable computation intensive tasks, e.g. related to neural network computations.

The parameters of the external audio processing device (ExD) of FIG. 5 (and/or the hearing device shown in FIG. 4) can be trained towards a specific hearing loss, and a specific hearing loss compensation strategy (such as NAL-NL2, DSL 5.0, etc.). The latency in the low-latency instrument (HD) can be specified. The latency may e.g. be 1 ms, 5 ms, 8 ms, or less than 10 ms. The parameters may be trained jointly in order to compensate for a hearing loss as well as in order to suppress background noise.

The encoder (LL-ENC) may be implemented with real-valued weights or alternatively with complex-valued weights.

The earpiece (EP) and the external audio processing device (ExD) may be connected by an electric cable. The link (LNK) may, however, be a short-range wireless (e.g. audio) communication link, e.g. based on Bluetooth, e.g. Bluetooth Low Energy, or Ultra-Wide Band (UWB) technology.

In the above description, the earpiece (EP) and the external audio processing device (ExD) are assumed to form part of the hearing device (HD). The external audio processing device (ExD) may be constituted by a dedicated, preferably portable, audio processing device, e.g. specifically configured to carry out (at least) more processing intensive tasks of the hearing device.

The external audio processing device (ExD) may be portable communication device, e.g. a smartphone, adapted to carry out processing tasks of the earpiece, e.g. via an application program (APP), but also dedicated to other tasks that are not directly related to the hearing device functionality.

The earpiece (EP) may comprise more functionality than shown in the embodiment of FIG. 5.

The earpiece (EP) may e.g. comprise a forward path that is used in a certain mode of operation, when the external audio processing device (ExD) is not available (or intentionally not used). In such case the earpiece (EP) may perform the normal function of the hearing device.

The hearing device (HD) may be constituted by a hearing aid (hearing instrument) or a headset.

FIG. 6 shows an example of a hearing device (HD), e.g. a hearing aid, according to the present disclosure comprising a similar functional configuration as in FIG. 5, but wherein only parts of the signal processing are moved to the external audio processing device (ExD). In the embodiment of FIG. 6, gain estimation (cf. block G) is performed in the external audio processing device (ExD), and the estimated gains ($G_{ENC}$) in the high dimensional domain are transmitted to the earpiece (EP) via the wireless link (LNK). The earpiece of FIG. 6 comprises a forward path comprising the (here two) microphones ($M_1$, $M_2$), respective low-latency encoders (LL-ENC) providing electric input signal(s) ($I_{ENC}$) in the high dimensional domain, a combination unit ('X', here a multiplication unit), a low-latency decoder (LL-DEC) and an output transducer (SPK, here a loudspeaker). The estimated gains ($G_{ENC}$) received in the earpiece from the external audio processing device (ExD) are applied to the electric input signal(s) ($I_{ENC}$) in the high dimensional domain in the combination unit ('X') of the earpiece (EP) and the resulting processed signal ($O_{ENC}$) is fed to the low-latency decoder (LL-DEC) of the earpiece providing processed (time-domain) output signal (O). The processed output signal (O) is fed to the loudspeaker (SPK) of the earpiece (EP) for presentation to the user as a hearing loss compensated sound signal.

Compared to the embodiment of FIG. 5, the external audio processing device (ExD) of the embodiment of FIG. 6 does not need an encoder.

In an embodiment, a hearing device (HD) is provided which is configured to switch between two modes of operation implementing the embodiments of FIG. 5 and FIG. 6, respectively, as different modes (in which case, the external audio processing device (ExD) comprises a low-latency decoder (LL-DEC)). Switching between the two modes of operation may be provided automatically in dependence of a current acoustic environment, and/or of a current processing capability (e.g. battery status) of the ear-piece (or the external audio processing device (ExD)). Switching between the two modes of operation may be provided via a user interface, e.g. implemented in the external audio processing device (ExD).

FIG. 7 shows an example of a binaural hearing system according to the present disclosure wherein the estimated gains may depend on signals from both hearing devices in a binaural hearing aid system. In the embodiment of FIG. 7, the binaural hearing system (e.g. a binaural hearing aid system) comprises first and second ear pieces (EP1, EP2) and an external audio processing device (ExD). The external audio processing device (ExD) is configured to service each of the first and second earpieces (EP1, EP2). Respective communication links (LNK) between each of the first and second earpieces (EP1, EP2) and the external audio processing device (ExD) may be established via appropriate transceiver circuitry (Rx, Tx) in the three devices. The first and second earpieces (EP1, EP2) of FIG. 7 comprise the same functional elements as shown in, and described in connection with, FIG. 6. In the embodiment of FIG. 7, the external audio processing device (ExD) is, however, configured to determine the estimated gains ($G_{ENC1}$), $G_{ENC2}$) based on microphone signals from both earpieces (EP1, EP2). Thereby binaural effects can be taken care of in the gain estimation (e.g. to ensure that spatial cues are appropriately maintained at the respective ears of the user, to maintain the user's directional awareness).

In an embodiment, spatial cues, such as interaural time differences or interaural level differences are part of the cost function in the optimization process. E.g. the interaural time difference between the left and the right target signals and the estimated left and right target signals may be implemented as a term in the cost function. Alternatively, the interaural transfer functions of the clean speech or the noise may be included in the cost function, in order to preserve spatial cues.

Figure 8:
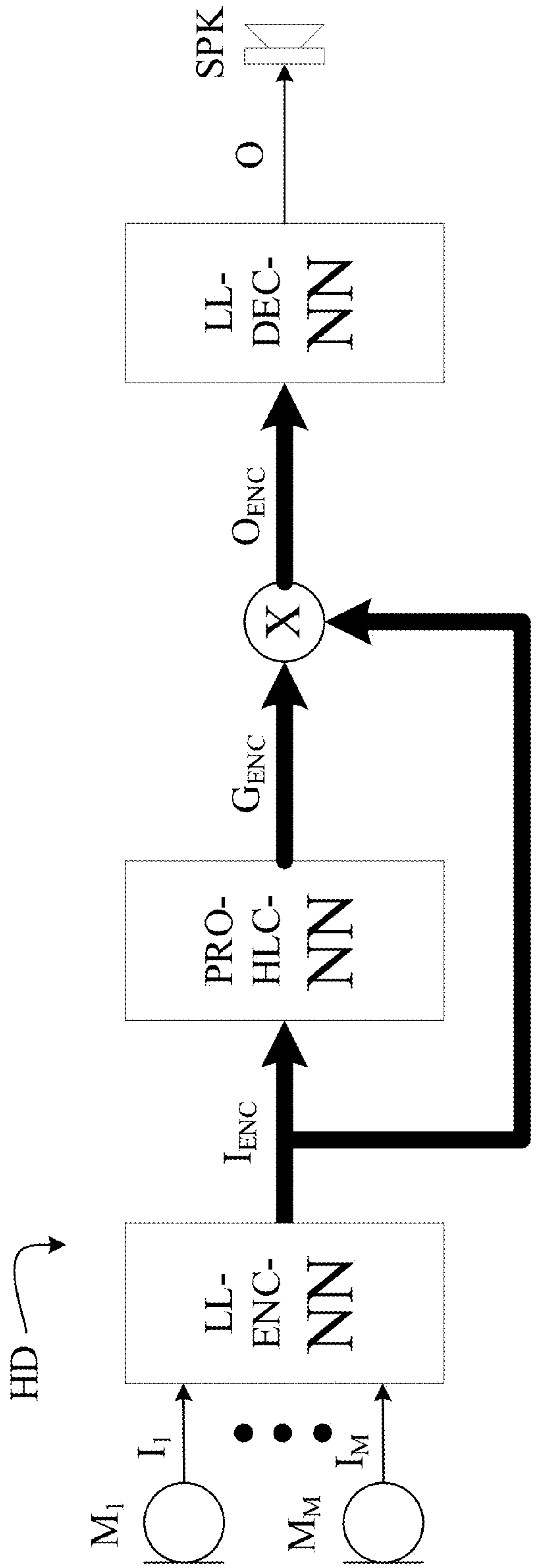
FIG. 8 shows an embodiment of a hearing aid according to the present disclosure.

FIG. 8 shows an embodiment of a hearing aid (HD) according to the present disclosure. The embodiment of FIG. 8 has the same functionality as the embodiment shown in FIG. 2. As in FIG. 2, the hearing aid (HD) comprises M input transducers, here microphones ($M_1, \ldots, M_M$, where $M \geq 1$), each providing an electric input signal ($I_1, \ldots, I_M$), which are fed to respective low-latency encoders (here all comprised in unit LL-ENC-NN). In FIG. 8, each of the low-latency encoder (LL-ENC-NN) and decoder (LL-DEC-NN) are implemented as a neural network (NN), e.g. respective feed forward neural networks. The processing unit (PRO, solid enclosure) is configured to compensate for the user's hearing impairment (e.g. by applying a hearing loss compensation algorithm, e.g. based on an audiogram of, and optionally on further data about, the user) is likewise implemented at least partially by a neural network, e.g. a recurrent neural network. In the embodiment of FIG. 8, the neural network of the processing unit (PRO-HLC-NN) receives an input vector comprising (or being extracted from) the encoded input signal(s) ($I_{ENC}$). The input vector of the neural network may comprise one or more 'frames' of the second high dimensional domain and provide as an output vector ($G_{ENC}$) a 'frame' of appropriate gain values $G_{ENC}$ in the second high dimension domain. The input vector may additionally comprise values of one or more sensors (e.g. a movement sensor) or detectors (e.g. a voice detector, e.g. an own voice detector, etc.). The input vector of the neural network of the processing unit may (for a given time unit) comprise stacked 'frames' of encoded versions of the M input signals ($I_1, \ldots, I_M$), or data extracted therefrom. The processing unit (PRO) further comprises a combination unit ('X'), here a multiplication unit, receiving the estimated gains ($G_{ENC}$) from the neural network (PRO-HLC-NN) and the encoded input signal(s) ($I_{ENC}$). The combination unit (CU) applies the estimated gains ($G_{ENC}$) to the encoded signal or signals ($I_{ENC}$), whereby the encoded processed output signal ($O_{ENC}$) of the processing unit (PRO) is provided and (here) fed to the decoder (L-DEC-NN) for conversion from the second (high dimensional) domain to the first (low dimensional) domain, here the time domain (cf. signal O). The processed (hearing loss compensated) time domain signal is fed to the output transducer, here a loudspeaker, and presented to the user. Other output transducers may be a vibrator of a bone conduction type hearing aid, or a multielectrode array of a cochlear implant type hearing aid.

Figure 9:
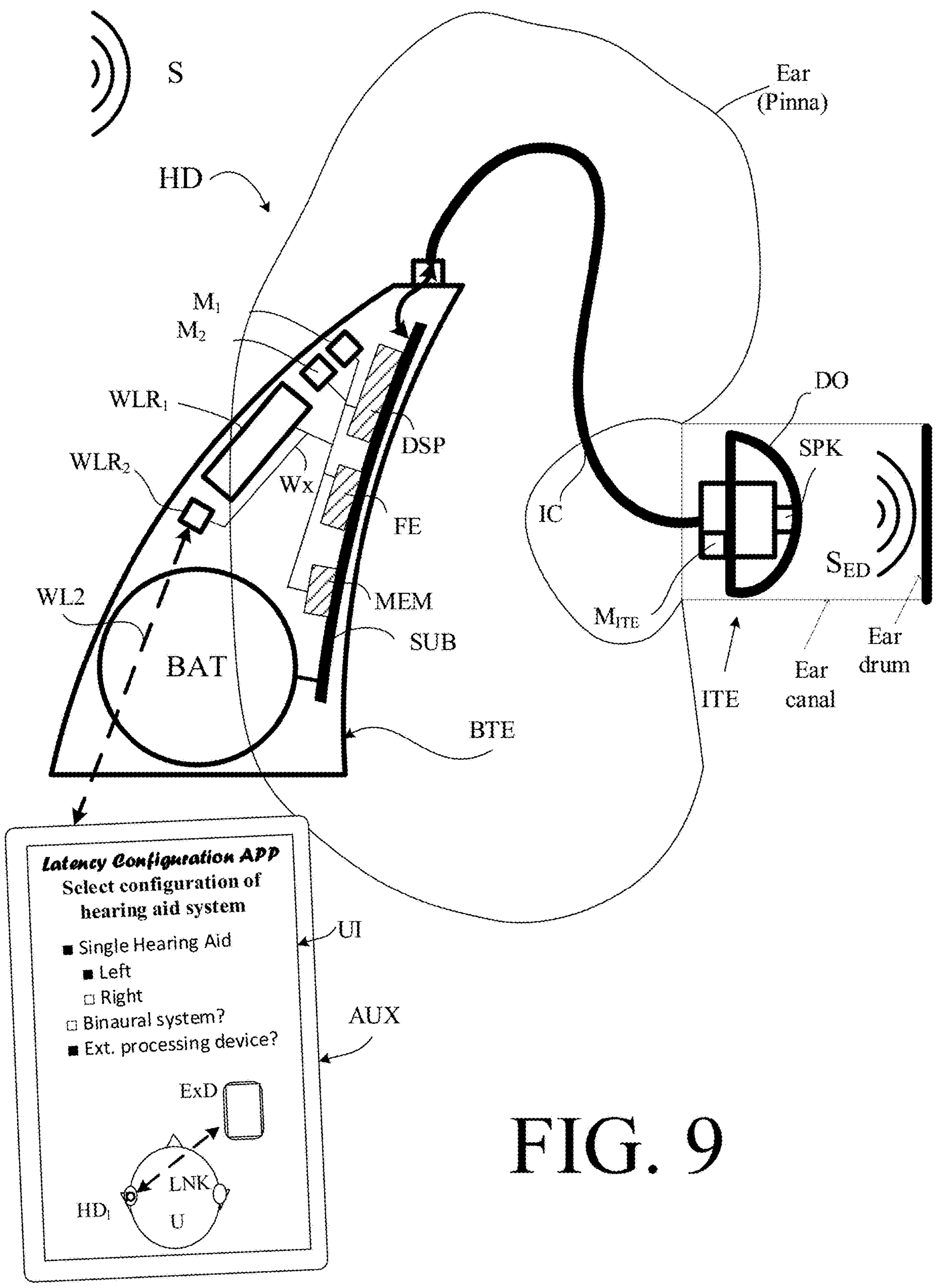
FIG. 9 shows an embodiment of a hearing aid according to the present disclosure comprising a BTE-part located behind an ear of the user and an ITE part located in an ear canal of the user in communication with an auxiliary device comprising a user interface for the hearing aid.

FIG. 9 shows an embodiment of a hearing aid according to the present disclosure comprising a BTE-part located behind an ear of the user and an ITE part located in an ear canal of the user in communication with an auxiliary device comprising a user interface for the hearing aid.

FIG. 9 shows an embodiment of a hearing device (HD), e.g. a hearing aid, according to the present disclosure comprising a BTE-part located behind an ear (Ear (Pinna)) of a user and an ITE part located in an ear canal of the user in communication with an auxiliary device (AUX) comprising a user interface (UI) for the hearing device. The auxiliary device (AUX) may comprise an external audio processing device as described in connection with FIG. 5, 6, 7. FIG. 9 illustrates an exemplary hearing aid (HD) formed as a receiver in the ear (RITE, Receiver-In-The-Ear) type hearing aid comprising a BTE-part (BTE) adapted for being located at or behind pinna (Ear (Pinna)) and a part (ITE) comprising an output transducer (e.g. a loudspeaker/receiver) adapted for being located in an ear canal (Ear canal) of the user (e.g. exemplifying a hearing aid (HD) as shown in FIG. 2 or FIG. 8). The BTE-part (BTE) and the ITE-part (ITE) are connected (e.g. electrically connected) by a connecting element (IC). In the embodiment of a hearing aid of FIG. 9, the BTE part (BTE) comprises two input transducers (here microphones) ($M_1$, $M_2$) each for providing an electric input audio signal representative of an input sound signal from the environment (in the scenario of FIG. 9, including sound source S). The hearing aid of FIG. 9 further comprises two wireless receivers or transceivers ($WLR_1$, $WLR_2$) for providing respective directly received auxiliary audio and/or information/control signals (and optionally for transmitting such signals to other devices). The hearing aid (HD) comprises a substrate (SUB) whereon a number of electronic components are mounted, functionally partitioned according to the application in question (analogue, digital, passive components, etc.), but including a signal processor (DSP), a front-end chip (FE) mainly containing analogue circuitry and interfaces between analogue and digital processing, and a memory unit (MEM) coupled to each other and to input and output units via electrical conductors Wx. The mentioned functional units (as well as other components) may be partitioned in circuits and components according to the application in question (e.g. with a view to size, power consumption, analogue vs digital processing, radio communication, etc.), e.g. integrated in one or more integrated circuits, or as a combination of one or more integrated circuits and one or more separate electronic components (e.g. inductor, capacitor, etc.). The signal processor (DSP) provides an enhanced audio signal (cf. signal O in FIG. 2, or FIG. 6-8), which is intended to be presented to a user. In the embodiment of a hearing aid device in FIG. 9 the ITE part (ITE) comprises an output unit in the form of a loudspeaker (receiver) (SPK) for converting the electric signal (O) to an acoustic signal (providing, or contributing to, acoustic signal SED at the ear drum (Ear drum). The ITE-part may further comprise an input unit comprising one or more input transducer (e.g. microphones). In FIG. 9, the ITE part comprises a microphone ($M_{ITE}$) located at an entrance to the ear canal of the user. The ITE-microphone ($M_{ITE}$) is configured to provide an electric input audio signal representative of an input sound signal from the environment at or in the ear canal (i.e. including any acoustic modifications of the input signal due to pinna, reflecting the acoustic characteristics of pinna). In another embodiment, the hearing aid may further comprise an input unit (e.g. a microphone or a vibration sensor) located elsewhere than at the entrance of the ear canal (e.g. facing the eardrum) in combination with one or more input units located in the BTE-part and/or the ITE-part. The ITE-part further comprises a guiding element, e.g. a dome, (DO) (or an open or closed mould) for guiding and positioning the ITE-part in the ear canal of the user.

The hearing aid (HD) exemplified in FIG. 9 is a portable device and further comprises a battery (BAT) for energizing electronic components of the BTE- and ITE-parts.

The hearing aid (HD) may comprise a directional microphone system adapted to enhance a target acoustic source relative to a multitude of acoustic sources in the local environment of the user wearing the hearing aid device (e.g. based on the electric input signals from two or more of the microphones ($M_1$, $M_2$, $M_{ITE}$). The memory unit (MEM) may comprise predefined (or adaptively determined) complex, frequency dependent constants defining predefined or (or adaptively determined) beam patterns, etc.

The memory (MEM) may e.g. comprise data related to the user, e.g. preferred settings.

The hearing aid of FIG. 9 may constitute or form part of a hearing aid and/or a binaural hearing system according to the present disclosure.

The hearing aid (HD) according to the present disclosure may comprise a user interface UI, e.g. as shown in the lower left part of FIG. 9 implemented in an auxiliary device (AUX), e.g. a remote control, e.g. implemented as an APP in a smartphone or other portable (or stationary) electronic device, e.g. a separate audio processing device as described above in connection with FIG. 5-7. In the embodiment of FIG. 9, the screen of the user interface (UI) illustrates a Latency Configuration APP. The screen 'Select configuration of hearing aid system' allows a user to decide how the processing according to the present disclosure is configured. The user may indicate whether a monaural (Single Hearing Aid system) or a binaural system comprising left and right hearing aids is currently relevant. The user may further for a monaural system indicate whether the hearing aid ($HD_l$) is located at the left or right ear. The user (U) may further indicate whether an external audio processing device (AxD) should be used or not (cf. embodiments as described in connection with FIG. 5, 6, 7). In the shown example, a monaural system using only a hearing device at the left ear of the user (U) is selected (cf. solid tick boxes (■) at 'Monaural system', and 'Left'). It is further selected that an external audio processing device communicating (via wireless link (LNK)) with the left hearing aid ($HD_l$), e.g. an earpiece, should be used (cf. solid tick box (■) at 'Ext. processing device?'). The auxiliary device (AUX (ExD)) and the hearing aid are adapted to allow communication of data representative of the currently selected configuration via a, e.g. wireless, communication link (cf. dashed arrow LNK in FIG. 9). The communication link WL2 between the hearing device (HD), and the auxiliary device (AUX (ExD)) may e.g. be based on far field communication, e.g. Bluetooth or Bluetooth Low Energy (or similar technology, e.g. UWB), implemented by appropriate antenna and transceiver circuitry in the hearing aid (HD) and the auxiliary device (AUX), indicated by transceiver unit $WLR_2$ in the hearing aid. The transceiver in the hearing aid indicated by WLR1 may be for establishing an interaural link, e.g. for exchanging audio signals (or parts thereof), and/or control or information parameters between the left and right hearing aids ($HD_l$, $HD_r$) of a binaural hearing aid system. The interaural link may e.g. be implemented as an inductive link or as the communication link (WL2).

The auxiliary device may e.g. be constituted by or comprise the external audio processing device (ExD).

Other aspects related to the control of hearing aid (e.g. the beamformer), the volume setting, specific hearing aid programs for a given listening situation, etc.) may be made selectable or configurable from the user interface (UI). The user interface may e.g. be configured to allow a user to decide on specific modes of operation of the latency setup, cf. e.g. as discussed in connection with FIG. 6.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

[Luo & Mesgarani; 2019] Yi Luo, Nima Mesgarani, "Conv-TasNet: Surpassing Ideal Time-Frequency Magnitude Masking for Speech Separation", IEEE/ACM transactions on audio, speech, and language processing, 27(8), 1256-1266 (2019).

[Lewicki & Sejnowski; 2000] Michael S. Lewicki, Terrence J. Sejnowski, "Learning Overcomplete Representations", Neural Computation, 12, 337-365, Massachusetts Institute of Technology (2000).

[Bell & Sejnowski; 1996] Anthony J Bell and Terrence J Sejnowski, "Learning the higher-order structure of a natural sound", Network: Computation in Neural Systems, 7, 261-266, IOP Publishing Ltd (1996).

The invention claimed is:

1. A hearing aid configured to be worn by a user, the hearing aid comprising at least one encoder, configured to convert a first number of samples from at least one stream of samples of an electric input signal in a first domain to a second number of samples in said at least one stream of samples of the electric input signal in the second domain, a processing unit configured to process said at least one electric input signal in the second domain, to provide a compensation for the user's hearing impairment, and to provide a processed signal as a stream of samples in the second domain; and a decoder, configured to convert said second number of samples from said stream of samples of the processed signal in the second domain to said first number of samples in said stream of samples of the electric input signal in the first domain, wherein:

the second number of samples is larger than the first number of samples, and said at least one encoder and at least a part of the processing unit are configured to be trained jointly in order to process the at least one electric input signal under a low-latency constraint.

2. A hearing aid according to claim 1 wherein the first domain is the time domain.

3. A hearing aid according to claim 1 wherein the encoder, the at least part of the processing unit and/or the decoder is/are implemented as a neural network.

4. A hearing aid according to claim 1 wherein the at least one encoder and the at least part of the processing unit are trained in a common training procedure with a single cost function.

5. A hearing aid according to claim 1 wherein said low-latency constraint comprises a restriction to the processing time through the hearing device.

6. A hearing aid according to claim 5 wherein said low-latency constraint is related to the processing time through the encoder, the processing unit and the decoder.

7. A hearing aid according to claim 1 wherein parameters of the at least one encoder and the processing unit are trained in order to minimize a cost function given by a difference between the hearing aid and a hearing aid comprising linear filter banks instead of said at least one encoder and said decoder.

8. A hearing aid according to claim 7 wherein said parameters of the at least one encoder and the processing unit that are trained include one or more of weight-, bias-, and non-linear function-parameters of a neural network.

9. A hearing aid according to claim 7 wherein parameters of the decoder are further trained in order to minimize the cost function, and said parameters of the at least one encoder and/or the decoder include one or more of the first and second number of samples.

10. A hearing aid according to claim 7 wherein said parameters of the at least one encoder that are trained include weights of the encoding matrix G.

11. A hearing aid according to claim 1 wherein a transformation matrix (G) of said at least one encoder is an $N2 \times N1$ matrix, where $N2>N1$, such that a transformed signal is $S=Gs$, where G is a $N2 \times N1$ matrix, the input signal s of the first domain is a $N1 \times 1$ vector, and the transformed signal S of the second domain is a $N2 \times 1$ vector.

12. A hearing aid according to claim 1 comprising an output unit for providing stimuli perceivable as sound to the user based on said stream of samples of the processed signal in the first domain.

13. A hearing aid according to claim 1 comprising
- at least one earpiece configured to be worn at or in an ear of the user; and
- a separate audio processing device,
- wherein said earpiece and said separate audio processing device are configured to allow an exchange of audio signals or parameters derived therefrom between each other.

14. A hearing aid according to claim 13, wherein said earpiece comprises
- at least one input unit for providing said at least one stream of samples of the electric input signal in the first domain, said at least one electric input signal representing sound in an environment of the hearing aid; and
- an output unit for providing stimuli perceivable as sound to the user based on said stream of samples of the processed signal in the first domain.

15. A hearing aid according to claim 13 wherein said separate audio processing device comprises said processing unit.

16. A hearing aid according to claim 13 wherein said separate audio processing device comprises said at least one encoder and/or said decoder.

17. A hearing aid according to claim 13 wherein said earpiece comprises said at least one encoder and/or said decoder.

18. A method of operating a hearing aid configured to be worn by a user, the method comprising:
- converting a first number of samples from at least one stream of samples of an electric input signal in a first domain to a second number of samples in said at least one stream of samples of the electric input signal in the second domain,
- processing said at least one electric input signal in the second domain to provide a compensation for the user's hearing impairment, and providing a processed signal as a stream of samples in the second domain; and
- converting said second number of samples from said stream of samples of the processed signal in the second domain to said first number of samples in said stream of samples of the electric input signal in the first domain,
- wherein the second number of samples is larger than the first number of samples, and wherein said converting of samples in the first domain to samples the second domain and at least a part of the processing are trained jointly in order to process the at least one electric input signal under a low-latency constraint.

19. A method according to claim 18, further comprising: optimizing parameters of the hearing aid by providing an electric input signal representing sound to said hearing aid and a filter bank-based hearing aid comprising a filter bank operating in the Fourier domain; and training parameters of said hearing aid in order to minimize a difference between an output of the said hearing aid based on the electric input signal and an output of a filter bank-based hearing aid based on the electric input signal.

20. A method according to claim 19 wherein said parameters comprise one or more of weight-, bias-, and non-linear function-parameters of a neural network, and one or more of the first and second number of samples.

* * * * *